(12) United States Patent
Gangi (10) Patent No.: US 7,083,087 B1
(45) Date of Patent: *Aug. 1, 2006

(54) METHOD AND APPARATUS FOR ASSOCIATING IDENTIFICATION AND PERSONAL DATA FOR MULTIPLE MAGNETIC STRIPE CARDS OR OTHER SOURCES

(75) Inventor: Frank J. Gangi, Frisco, TX (US)

(73) Assignee: E-Micro Corporation, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/130,765

(22) Filed: May 17, 2005

Related U.S. Application Data (63) Continuation of application No. 10/052,405, filed on Jan. 17, 2002, now Pat. No. 6,938,821, which is a continuation-in-part of application No. 09/664,205, filed on Sep. 18, 2000, now Pat. No. 6,402,029.

(51) Int. Cl.
*G06K 5/00* (2006.01)
(52) U.S. Cl. ...................... 235/380; 235/379
(58) Field of Classification Search ................ 235/380; 705/70–75
See application file for complete search history.

(56) References Cited

U.S. PATENT DOCUMENTS

| 4,701,601 A | 10/1987 | Francini et al. |
| 4,705,211 A | 11/1987 | Honda et al. |
| 4,837,422 A | 6/1989 | Dethloff et al. |
| 4,868,376 A | 9/1989 | Lessin et al. |
| 5,095,196 A | 3/1992 | Miyata |
| 5,135,095 A | 8/1992 | Kocznar et al. |

(Continued)

FOREIGN PATENT DOCUMENTS

DE 100 50 882 A1 5/2002

(Continued)

OTHER PUBLICATIONS

Towitoko Electronics, "Product Overview Smartcard Terminals & Systems", Feb.

(Continued)

*Primary Examiner*—Thien M. Le
*Assistant Examiner*—Kristy A. Haupt
(74) *Attorney, Agent, or Firm*—Bracewell & Giuliani LLP (57) ABSTRACT

A method and apparatus for warehousing information in a wallet consolidator, including personal identification data for facilitating a transaction. The wallet consolidator includes a controller for controlling operation of the wallet consolidator, a magnetic stripe reader/writer for reading and writing magnetic stripes, a bar code scanner for scanning bar codes, a keypad for inputting user selections and commands, a memory for storing information provided to the wallet consolidator, a smart card interface for effectuating communication between the wallet consolidator and a smart card and a display screen for displaying text and graphics, the display screen further for displaying a bar code pattern capable of being scanned by a bar code reader. To store information in the wallet consolidator, or alternatively in a smart card interfaced to the wallet consolidator, information is read from magnetic stripes on various types of cards such as, but not limited to, credit, debit and identification cards. Additionally, images of the cards including, but not limited to, signatures and portraits are downloaded and stored. A user retrieves the information from any of the stored magnetic stripes and writes the information to a single magnetic stripe for use in a point of sale transaction. Similarly, stored images are retrieved and displayed on a display screen including a bar code which can be scanned by a bar code scanner.

23 Claims, 5 Drawing Sheets

U.S. PATENT DOCUMENTS

| | | |
|---|---|---|
| 5,276,311 A | 1/1994 | Hennige |
| 5,585,787 A | 12/1996 | Wallerstein |
| 5,895,903 A | 4/1999 | Abe et al. |
| RE36,365 E | 11/1999 | Levine et al. |
| 6,131,811 A | 10/2000 | Gangi |
| 6,189,787 B1 | 2/2001 | Dorf |
| 6,293,462 B1 | 9/2001 | Gangi |
| 6,370,488 B1 | 4/2002 | Beaudoin et al. |
| 6,402,029 B1 | 6/2002 | Gangi |
| 6,403,029 B1 | 6/2002 | Schmidt |
| 6,473,500 B1 | 10/2002 | Risafi et al. |
| 6,505,772 B1 | 1/2003 | Mollett et al. |
| 6,685,088 B1 | 2/2004 | Royer et al. |
| 6,755,344 B1 | 6/2004 | Mollett et al. |
| 6,789,189 B1 | 9/2004 | Wheeler et al. |
| 6,820,199 B1 | 11/2004 | Wheeler et al. |
| 6,827,260 B1 | 12/2004 | Stoutenburg et al. |
| 6,851,054 B1 | 2/2005 | Wheeler et al. |
| 6,888,742 B1 | 5/2005 | Nguyen et al. |
| 6,915,430 B1 | 7/2005 | Wheeler et al. |
| 6,935,559 B1 | 8/2005 | Mollett et al. |
| 6,938,156 B1 | 8/2005 | Wheeler et al. |
| 6,938,821 B1 * | 9/2005 | Gangi .................. 235/380 |
| 6,950,940 B1 | 9/2005 | Wheeler et al. |
| 6,952,773 B1 | 10/2005 | Wheeler et al. |
| 6,957,770 B1 | 10/2005 | Robinson |
| 6,959,381 B1 | 10/2005 | Wheeler et al. |
| 6,978,369 B1 | 12/2005 | Wheeler et al. |
| 6,981,154 B1 | 12/2005 | Wheeler et al. |
| 6,991,157 B1 | 1/2006 | Bishop et al. |
| 6,991,160 B1 | 1/2006 | Demere |
| 6,993,510 B1 | 1/2006 | Guy et al. |
| 7,010,691 B1 | 3/2006 | Wheeler et al. |
| 2001/0045454 A1 | 11/2001 | Gangi |
| 2001/0048023 A1 | 12/2001 | Fitzmaurice et al. |
| 2002/0087462 A1 | 7/2002 | Seifert et al. |
| 2002/0104878 A1 | 8/2002 | Seifert et al. |
| 2002/0112160 A2 | 8/2002 | Wheeler et al. |
| 2002/0138363 A1 | 9/2002 | Karas et al. |
| 2002/0138424 A1 | 9/2002 | Coyle |
| 2002/0139849 A1 | 10/2002 | Gangi |
| 2002/0143566 A1 | 10/2002 | Diveley |
| 2002/0143706 A1 | 10/2002 | Diveley |
| 2002/0152168 A1 | 10/2002 | Neofytides et al. |
| 2002/0152176 A1 | 10/2002 | Neoftytides et al. |
| 2002/0153414 A1 | 10/2002 | Stoutenburg et al. |
| 2002/0156683 A1 | 10/2002 | Stoutenburg et al. |
| 2002/0161702 A1 | 10/2002 | Milberger et al. |
| 2002/0166891 A1 | 11/2002 | Stoutenburg et al. |
| 2002/0169719 A1 | 11/2002 | Diveley et al. |
| 2002/0174014 A1 | 11/2002 | Cuervo |
| 2002/0178025 A1 | 11/2002 | Hansen et al. |
| 2002/0198806 A1 | 12/2002 | Blagg et al. |
| 2003/0021242 A1 | 1/2003 | Drysdale et al. |
| 2003/0024979 A1 | 2/2003 | Hansen et al. |
| 2003/0036956 A1 | 2/2003 | Karas et al. |
| 2003/0051145 A1 | 3/2003 | Jackson et al. |
| 2003/0055780 A1 | 3/2003 | Hansen et al. |
| 2003/0065624 A1 | 4/2003 | James et al. |
| 2003/0069856 A1 | 4/2003 | Seifert et al. |
| 2003/0083987 A1 | 5/2003 | Stoutenberg et al. |
| 2003/0093367 A1 | 5/2003 | Allen-Roumann et al. |
| 2003/0095665 A1 | 5/2003 | Wheeler et al. |
| 2003/0097561 A1 | 5/2003 | Wheeler et al. |
| 2003/0097562 A1 | 5/2003 | Wheeler et al. |
| 2003/0097565 A1 | 5/2003 | Wheeler et al. |
| 2003/0097569 A1 | 5/2003 | Wheeler et al. |
| 2003/0097570 A1 | 5/2003 | Wheeler et al. |
| 2003/0097573 A1 | 5/2003 | Wheeler et al. |
| 2003/0101136 A1 | 5/2003 | Wheeler et al. |
| 2003/0101344 A1 | 5/2003 | Wheeler et al. |
| 2003/0110129 A1 | 6/2003 | Frazier et al. |
| 2003/0115463 A1 | 6/2003 | Wheeler et al. |
| 2003/0120498 A1 | 6/2003 | Villapudua |
| 2003/0126036 A1 | 7/2003 | Mascavage, III et al. |
| 2003/0126067 A1 | 7/2003 | Seifert et al. |
| 2003/0126075 A1 | 7/2003 | Mascavage, III et al. |
| 2003/0126083 A1 | 7/2003 | Seifert et al. |
| 2003/0126437 A1 | 7/2003 | Wheeler et al. |
| 2003/0126438 A1 | 7/2003 | Wheeler et al. |
| 2003/0126439 A1 | 7/2003 | Wheeler et al. |
| 2003/0130907 A1 | 7/2003 | Karas et al. |
| 2003/0130940 A1 | 7/2003 | Hansen et al. |
| 2003/0130948 A1 | 7/2003 | Alglene et al. |
| 2003/0131234 A1 | 7/2003 | Wheeler et al. |
| 2003/0131235 A1 | 7/2003 | Wheeler et al. |
| 2003/0135438 A1 | 7/2003 | Blagg et al. |
| 2003/0135459 A1 | 7/2003 | Abelman et al. |
| 2003/0154164 A1 | 8/2003 | Mascavage, III et al. |
| 2003/0155416 A1 | 8/2003 | Macklin et al. |
| 2003/0158818 A1 | 8/2003 | George et al. |
| 2003/0171992 A1 | 9/2003 | Blagg et al. |
| 2003/0172039 A1 | 9/2003 | Guy et al. |
| 2003/0177067 A1 | 9/2003 | Cowell et al. |
| 2003/0182218 A1 | 9/2003 | Blagg |
| 2003/0187712 A1 | 10/2003 | Arthus et al. |
| 2003/0222135 A1 | 12/2003 | Stoutenburg et al. |
| 2003/0222136 A1 | 12/2003 | Bolle et al. |
| 2003/0225689 A1 | 12/2003 | MacFarlane et al. |
| 2003/0229541 A1 | 12/2003 | Randall et al. |
| 2003/0229578 A1 | 12/2003 | Hansen et al. |
| 2003/0236747 A1 | 12/2003 | Sager |
| 2004/0006537 A1 | 1/2004 | Zelecoski et al. |
| 2004/0030647 A1 | 2/2004 | Hansen et al. |
| 2004/0039693 A1 | 2/2004 | Nauman et al. |
| 2004/0039702 A1 | 2/2004 | Blair et al. |
| 2004/0049452 A1 | 3/2004 | Blagg |
| 2004/0054625 A1 | 3/2004 | Kellogg et al. |
| 2004/0064405 A1 | 4/2004 | Weichert |
| 2004/0065726 A1 | 4/2004 | McGee et al. |
| 2004/0068437 A1 | 4/2004 | McGee et al. |
| 2004/0073511 A1 | 4/2004 | Beaumount et al. |
| 2004/0078327 A1 | 4/2004 | Frazier et al. |
| 2004/0083184 A1 | 4/2004 | Tsuei et al. |
| 2004/0088261 A1 | 5/2004 | Moore et al. |
| 2004/0112952 A1 | 6/2004 | Algiene et al. |
| 2004/0117299 A1 | 6/2004 | Algiene et al. |
| 2004/0117302 A1 | 6/2004 | Weichert et al. |
| 2004/0138947 A1 | 7/2004 | McGee et al. |
| 2004/0148203 A1 | 7/2004 | Whitaker et al. |
| 2004/0148286 A1 | 7/2004 | Rogers |
| 2004/0159699 A1 | 8/2004 | Nelson et al. |
| 2004/0186773 A1 | 9/2004 | George et al. |
| 2004/0210476 A1 | 10/2004 | Blair et al. |
| 2004/0210521 A1 | 10/2004 | Crea et al. |
| 2004/0211831 A1 | 10/2004 | Stoutenburg et al. |
| 2004/0030657 A1 | 12/2004 | Holm-Blagg et al. |
| 2004/0254894 A1 | 12/2004 | Tsuei et al. |
| 2004/0260653 A1 | 12/2004 | Tsuei et al. |
| 2005/0005117 A1 | 1/2005 | Wheeler et al. |
| 2005/0005118 A1 | 1/2005 | Wheeler et al. |
| 2005/0005123 A1 | 1/2005 | Wheeler et al. |
| 2005/0005124 A1 | 1/2005 | Wheeler et al. |
| 2005/0010505 A1 | 1/2005 | Darrell |
| 2005/0015280 A1 | 1/2005 | Gabel et al. |
| 2005/0017067 A1 | 1/2005 | Selfert et al. |
| 2005/0044373 A1 | 2/2005 | Wheeler et al. |
| 2005/0080691 A1 | 4/2005 | Holm-Blagg |
| 2005/0167481 A1 | 8/2005 | Hansen et al. |
| 2005/0267840 A1 | 12/2005 | Holm-Blagg et al. |
| 2005/0288964 A1 | 12/2005 | Luten et al. |
| 2006/0005192 A1 | 1/2006 | Prendergast et al. |
| 2006/0016879 A1 | 1/2006 | Kean |
| 2006/0036496 A1 | 2/2006 | Cowell et al. |

| | | | |
|---|---|---|---|
| 2006/0036543 | A1 | 2/2006 | Blagg et al. |
| 2006/0059040 | A1 | 3/2006 | Eldred et al. |

FOREIGN PATENT DOCUMENTS

| | | |
|---|---|---|
| EP | 0656600 | 6/1995 |
| EP | 0656600 A2 | 6/1995 |
| JP | 61253580 | 11/1986 |
| JP | 2004102784 | 4/2004 |
| WO | WO 98/10363 | 3/1998 |
| WO | WO 98/12675 | 3/1998 |
| WO | WO 01/29789 A1 | 4/2001 |
| WO | WO 01/61920 A1 | 8/2001 |
| WO | WO 01/088659 A1 | 11/2001 |
| WO | WO 2005/052871 A1 | 6/2005 |

OTHER PUBLICATIONS

Vedder, Dr. Klaus and Dr. Franz Weikmann, "Smart Cards—Requirements, Properties and Applications", 1998.

"ActivCard", ActivCard, Inc., 1998.

"Value-Checker CP", OKI Advanced Products, OKI America, Inc., 1998.

"Logismart Chipcard Readers—Worth Your Attention", Logis Chipcard Products, 1998.

"Setpurse", Sectec Oy, 1998.

"NURI Smart Card Solutions", NURI Information & Communication, Inc., 1998.

"Visa Smart", Visa U.S.A.

Towitoko Electronics, "Product Overview Smartcard Terminals & Systems", Feb., 1998.

Dr. Klaus Vedder and Dr. Franz Weikmann, Giesecke & Devrient, "Smart Cards—Requirements, Properties and Applications", 1998.

"ActivCard", ActivCard, Inc., 1998.

OKI Advanced Products, OKI America, Inc., "Value-Checker.TM. CP", 1998.

Logis Chipcard Products, "Logismart Chipcard Readers—Worth Your Attention", 1998.

Setec Oy, "Setpurse.TM.", 1998.

NURI Information & Communication Inc., "NURI Smart Card Solutions", 1998.

Visa U.S. S., "Visa® Smart".

* cited by examiner

| | RECORDING DENSITY (bits per inch) | CHARACTER CONFIGURATION (including parity bit) | INFORMATION CONTENT (including control characters) |
|---|---|---|---|
| 0.110" TRACK 1 IATA | 210 BPI | 7 BITS PER CHARACTER | 79 ALPHANUMERIC CHARACTERS |
| 0.110" TRACK 2 ABA | 75 BPI | 5 BITS PER CHARACTER | 40 NUMERIC CHARACTERS |
| 0.110" TRACK 3 THRIFT | 210 BPI | 5 BITS PER CHARACTER | 107 NUMERIC CHARACTERS |

─────── 76 ALPHA NUMERIC DATA CHARACTERS ───────

| SS | FC | PAN | FS | NAME | FS | ADDITIONAL DATA | | DISCRETIONARY DATA | | ES | LRC |
|---|---|---|---|---|---|---|---|---|---|---|---|
| | | Primary Account No. (19 digits Max) | | Name (26 alphanumeric characters Max) | | | NO. OF CHARACTERS | | NO. OF CHARACTERS | | |
| | | | | | | Expiration Date (YYMM) | 4 | PVK1 | 1 | | |
| | | | | | | Service Code | 3 | PW OR Offset | 4 | | |
| | | | | | | | | CW or CVC | 3 | | |
| | | | | | | | | Some or all of the above fields may be found within the Discretionary data. | | | |

FIG. 4.

104 ALPHA NUMERIC DATA CHARACTERS

| SS | FC | PAN | FS | USE AND SECURITY DATA | ES | ADDITIONAL DATA | LRC |
|----|----|-----|----|-----|----|-----|-----|
| | | Primary Account No. (19 digits Max) | | | | | |

PAN: Primary Account No. (19 digits Max)

USE AND SECURITY DATA:

| | NO. OF CHARACTERS |
|---|---|
| Country Code (opt.) | 3 |
| Currency Code | 3 |
| Currency Exponent | 1 |
| Amount Authorized per Cycle | 4 |
| Amount Remaining this Cycle | 4 |
| Cycle Begin (Validity Datae) | 4 |
| Cycle Length | 2 |
| Retry Count | 1 |
| PIN Control Parameters | 6 |
| Interchange Control | 1 |
| PAN Service Restriction | 2 |
| SAN-1 Service Restriction | 2 |
| SAN-2 Service Restriction | 2 |
| Expiration Date (opt.) | 4 |
| Card Sequence Number | 1 |
| Card Security Number (opt.) | 9 |

ADDITIONAL DATA:

| | NO. OF CHARACTERS |
|---|---|
| First Subsidiary Account Number (opt.) | |
| Secondary Subsidiary Account Number (opt.) | |
| Relay Marker | 1 |
| Cryptographic Check Digits (opt.) | 6 |
| Discretionary Data | |

FIG. 5.

METHOD AND APPARATUS FOR ASSOCIATING IDENTIFICATION AND PERSONAL DATA FOR MULTIPLE MAGNETIC STRIPE CARDS OR OTHER SOURCES

CROSS REFERENCE TO RELATED APPLICATION

This is a continuation patent application which claims priority to and the benefit of U.S. patent application Ser. No. 10/052,405, filed Jan. 17, 2002, now U.S. Pat. No. 6,938,821 which is a continuation-in-part of U.S. patent application Ser. No. 09/664,205, filed on Sep. 18, 2000, now U.S. Pat. No. 6,402,029, titled "Method and Apparatus For Associating Identification and Personal Data for Multiple Magnetic Stripe Cards or Other Sources", all of which are incorporated herein by reference in their entireties.

TECHNICAL FIELD THE INVENTION

This invention relates generally to an improvement for the use of magnetic striping on devices such as credit cards and the like, and in particular, but not by way of any limitation to a methodology and improved magnetic stripe card which is capable of encoding additional information other than that originally presented on the card, particularly identification and personal data.

BACKGROUND OF THE INVENTION

In today's electronic commerce there has been a proliferation in the use of various types of credit, debit, identification and other types of authorization cards. For example, an average individual is likely to carry a driver's licence, several credit and/or debit cards, an identification card for access to a health club, an identification card to gain access to a place of employment and an access card to gain entry into a parking garage, among others. Furthermore, with advances in electronic commerce, smart cards are likely to replace paper and coin money resulting in an additional card for consumers to carry. Each of these cards typically incorporates a magnetic stripe or bar code to facilitate easy recognition of the card and to store various types of data. Although the use of these cards allow for easy and efficient electronic commerce, the number of such cards quickly becomes cumbersome and many individuals find carrying the large number of cards inconvenient.

Prior art magnetic stripe credit cards and the like have various limitations. For example, virtually all the prerecorded magnetic stripe cards that are currently in use are used for a single purpose. For example, a credit card or an identity card is generally used for just that purpose alone. In many instances, owners and users of these type of cards need to present several cards in order to maximize or complete a given transaction. Specifically, a discount card such as is used in certain supermarkets as well as the credit card to make the purchase must be both presented so as to obtain the discount.

Various solutions such as providing a sticker which can be placed on a credit card or the like have been suggested, however, these defeat the purpose of having an increased level of automation for check outs for example.

There are many instances whereby an individual, consumer, entity, organization, etc., would find it desirable to provide others with a secure, customized set of Id data that would facilitate a transaction and or event of a specific type.

Additionally, the receiver of the data for the transaction may wish to provide complimenting and supplemental data back to the originator of the transaction and all such transactions being done in a digitized format to be interpreted, manipulated and/or displayed on Point-of sale transaction (POS) devices/computers both at the POS and remotely. Additionally, the process of initializing this secure transaction would be more flexible if the acceptors of the transaction could utilize a Magnetic stripe card that could combine a unique identifying code with the standard ISO data from other completely different financial or other card's magnetically striped data.

Accordingly, the inventor herein proposes a solution which is both cost efficient and time efficient and which allows the use of conventional types of magnetic stripe readers which are currently being used in most retail establishments. One embodiment of the present invention allows for a single swipe of the card through the magnetic strip reader to provide all the information in one pass. This can be accomplished by recording onto the conventional magnetic strip of the credit card, the desired data from multiple cards and other sources which are necessary to complete a chosen transaction. In particular, a secure, customized set of identification data may be used to facilitate a transaction or even of a specific type.

SUMMARY OF THE INVENTION

This invention uses a method and apparatus for providing onto the magnetic stripe of a card additional information and consolidating multiple information from multiple cards as well as other sources onto the magnetic stripe card. In order to do so, a wallet consolidator, such as that shown in co-pending U.S. patent application Ser. No. 09/087,193 filed May 29, 1998 (for which a Notice of Allowance has been issued), could be employed. Although other types of readers and writers could be used to generate this data, this invention should in no way be considered to be limited to the use of any specific wallet consolidator or other means such as is mentioned above. Specifically, a device such as a wallet consolidator can be used in which the magnetic stripe information from multiple credit cards can be read from what is generally the commonly used three ISO/8711 tracks that are present on the card. However, it should be noted that in many types of credit cards one or more of these tracks may have no data provided on the card. What then can be accomplished is the reading of multiple tracks from multiple cards storing this all in memory and then rewriting the information to either a blank card or to the existing card after erasing the information along with, if necessary, additional "foreign" data onto the card. In an other embodiment it may be possible to write the additional foreign data on an existing card without an erasure and re-writing of the data, however this is not the preferred mode of operation.

In one embodiment of this invention, a secure, customized set of personal identification data is placed at the end of any data which was originally on the track or on an empty track. It may also be placed at any other position that the reading software in a point of sale (POS) terminal would have or would find to be ideal, this could also be at the front of a track for example or embedded within the track. The data of each track is formatted with a start sentinel character followed by the data itself followed by a stop sentinel. This data is then used to facilitate a transaction and/or event of a specific type. Conventional magnetic swipe readers look for the start or stop sentinel to indicate that a body of data follows. It should be noted however, that some readers will read the data irrespective of which way the card is swiped through the reader. The electronic circuitry in these types of readers detect the direction of the swipe by noting whether a start or stop sentinel is received first. This means that foreign data placed after the stop sentinel will not be recognized if it is not bracketed by standard start and stop sentinels.

The ISO-8711 standard specifies that at least two machine control codes for each type of track specifically, the types of tracks can be for example 75 or 210 bpi. These control codes and be used to bracket the foreign data. It would then be possible to design the reader that will look for data bracketed by the special control codes and/or designed software that will look for the data bracketed by these special control codes after a standard stop sentinel. Foreign data such as a coupon information, a discount card number or the like may be written in any track that was originally unused or even if used after a stop sentinel is present, and if that foreign data is bracketed by these special control codes then the foreign data will not be read by standard magnetic swipe readers and therefore will be ignored. However, special readers in the software at the host computer for the transaction can look for these control codes and then confine the foreign data and organize it in a manner acceptable for multiple purposes in the individual cards. This makes it possible to have additional information placed on the magnetic stripe card which would not be read by conventional readers in the field but would be obtainable from specialized readers.

BRIEF DESCRIPTION OF THE DRAWINGS

The novel features of the present invention will be understood and appreciated by one of ordinary skill in the art by reference to the following detailed description of the invention taken in conjunction with the accompanying drawings and which.

DETAILED DESCRIPTION OF THE INVENTION

Applicant has discovered that there are many instances whereby an individual, consumer, entity, organization, etc. would find it desirable to provide others with a secure, customized set of identification data that would facilitate a transaction or event of a specific type. Using the basic principles of the present invention as described in the above referenced prior filed patent application of Applicant, the process is thus described.

Figure 1:
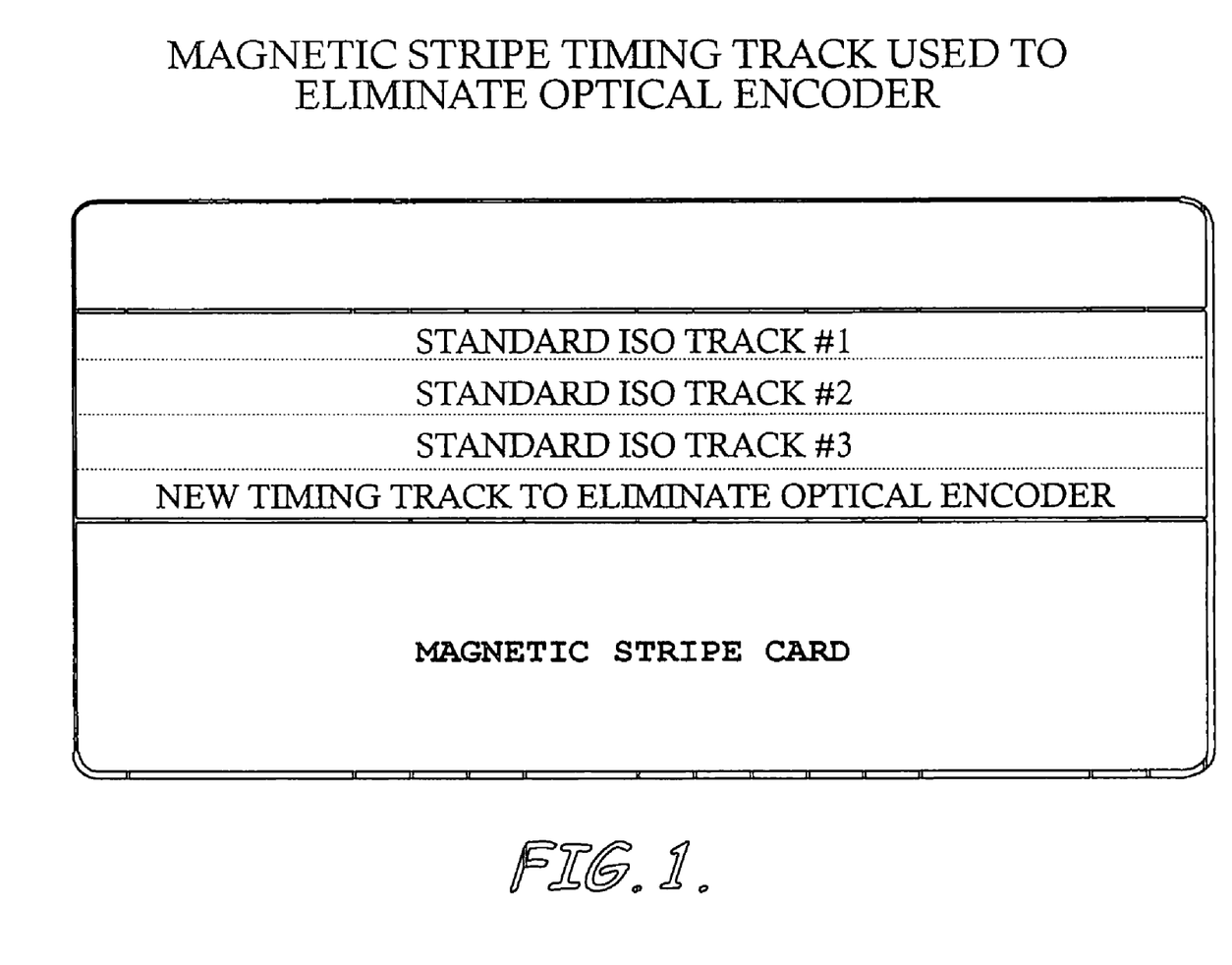
FIG. 1 is a track layout in accordance with one aspect of the present invention.
Figure 2:
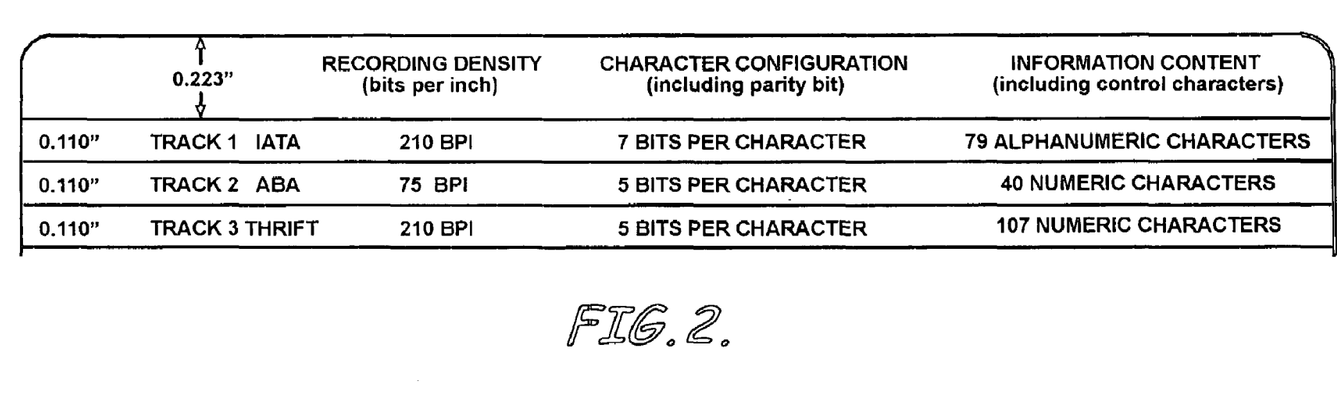
FIG. 2 is a layout of the conventional ISO track diagram.

Referring first to the description and drawings of the above referenced prior filed application of Applicant, it may be seen that FIG. 1 herein shows that an additional timing track 10 can be employed on a card 20 in this invention which may be used to ameliorate the need of an optical encoder in a device such as the wallet consolidator discussed above or in other types of readers. This is provided in that most conventional magnetic stripe readers use a mechanical sensor or optical sensor which is used to detect the speed at which the magnetic stripe card is being read through the stripe reader. By having an additional timing track supplied as an additional track the inventor herein has provided a means by which the reader can be made at a lower cost by using the timing track herein to determine the timing arrangement. However, this additional timing track 10 is not necessary for the operation of this invention, and in fact the conventional encoding and timing mechanism are quite satisfactory.

One of the significant features of this invention is that multiple stripes from various credit cards can be read and consolidated onto one card as is set forth in aforementioned wallet consolidator patent application. One of the unique features of this invention is the ability to take foreign or other sources and to add that material onto a given track on the card. The wallet consolidator uses the individual memory chip or smart chip contained on a card to store information however, this information can also be temporarily stored in the memory of a device such as the wallet consolidator and added to the magnetic stripe. One of the unique features of applicant's invention is the use of the fact that a standard track of one card data format, has an amount of information which is known as discretionary data which can be placed on any given card in any one of the standard three tracks. By using the control code to indicate the type of track is in a different format at using these control codes to "bracket" an individual stream of data and placing this after a standard stop sentinel on a data track a conventional reader would inherently ignore the information contained within this section. However, a specially constructed reader/writer would be able to look for or create these special control codes or the software within the conventional reader could be altered so that upon recognition of these special control codes this additional information could be decoded. This allows for a "hiding" of additional information which can be consolidated onto a given card to be employed and used in a very expeditious manner. Further it will be understood that the sentinels described above need not be employed to practice this invention and that other types of software codes can be used so that a POS terminal either as they exist today or with custom reprogramming can be used to read the additional or foreign information that is to be "added" to conventional tracks. The start and stop sentinels have been described herein as only an example of the types of control codes that can be used to bracket the foreign data that is to be added to the card stripe. Further a control code could be programmed into the stripe that can be recognized by the POS reader to indicate that this is for example a credit card, a second code could indicate that this is a discount or affinity card, and yet a third code could indicate that this is a drivers license. These codes could also be combined in various ways. Prior art systems have not used these special control codes to effectively hide additional data on a given track. This additional information can be used effectively.

Figure 3:
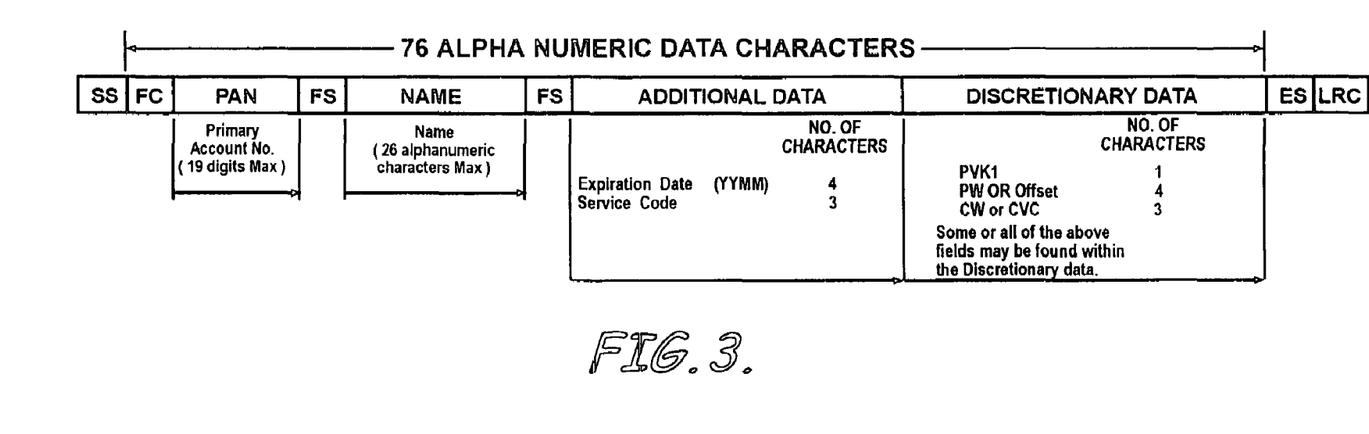
FIGS. 3, 4, and 5 are more detailed descriptions of the track layout under a standard ISO-8711 standard.
Figure 4:
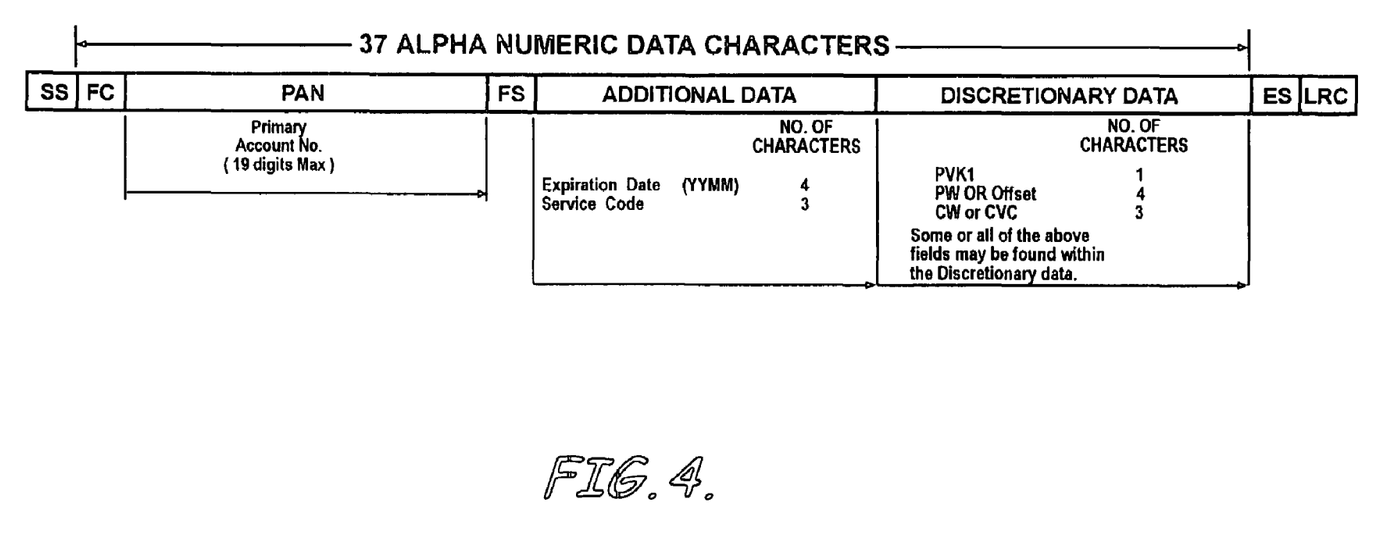
Figure 5:
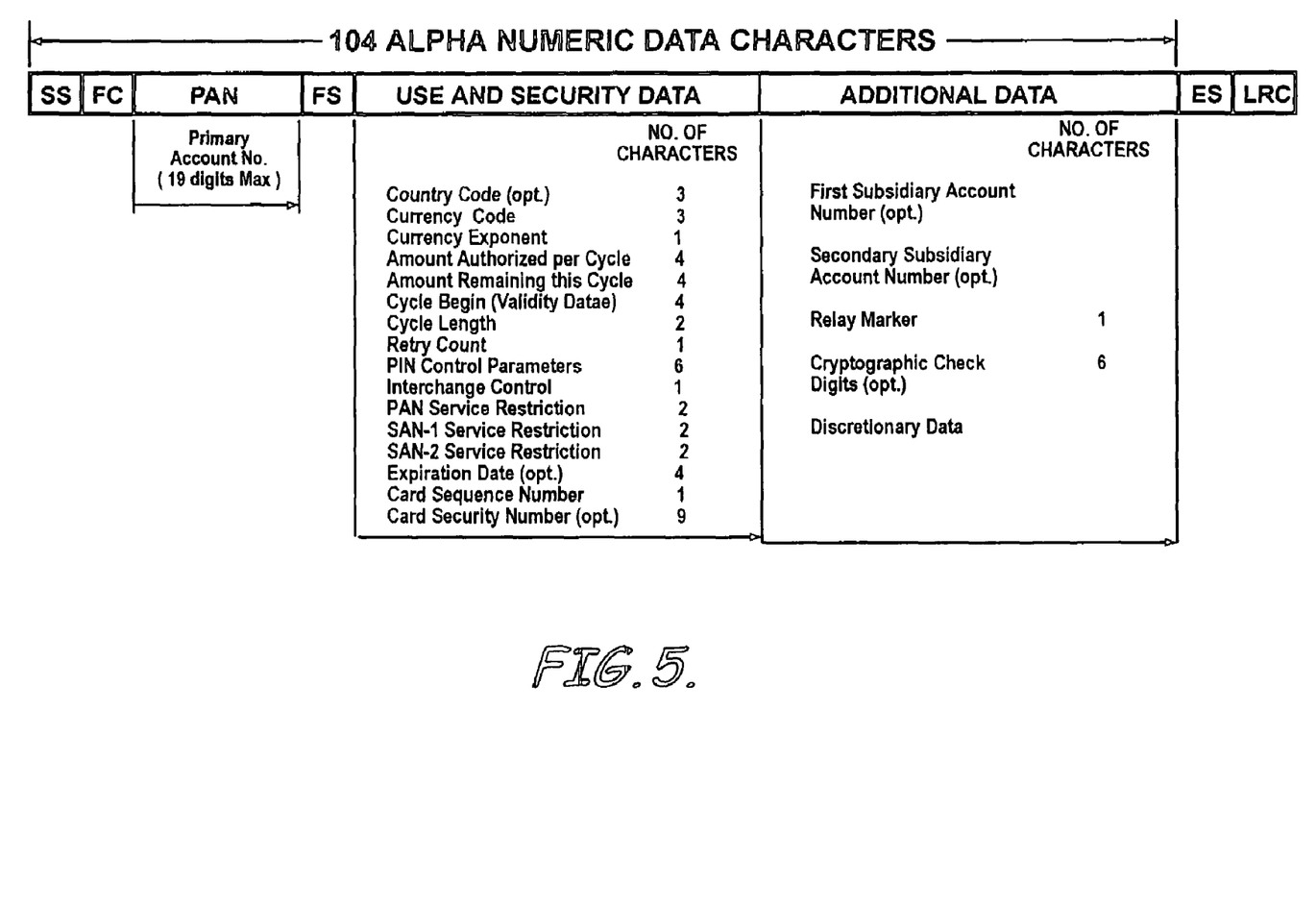

This can be made more clear when one reviews FIGS. 3, 4 and 5 which shows the significant amount of space that is available for "either discretionary data or additional data" on a given track. This is especially true when the 210 bpi track is used. The additional either alpha numeric or numeric characters provides a significant amount of space for additional data to be placed on a given card which has been unavailable in prior art systems. Additionally, as the control code can be used to effectively to "shift" the track concentration from 75 to 210 bpi in the middle of the track additional information can be "hidden" as still be provided to a specially outfitted or programmed reader. Accordingly, additional data can be used and be present on a card which would not be generally readable without the proper equipment or programming.

Figure 6:
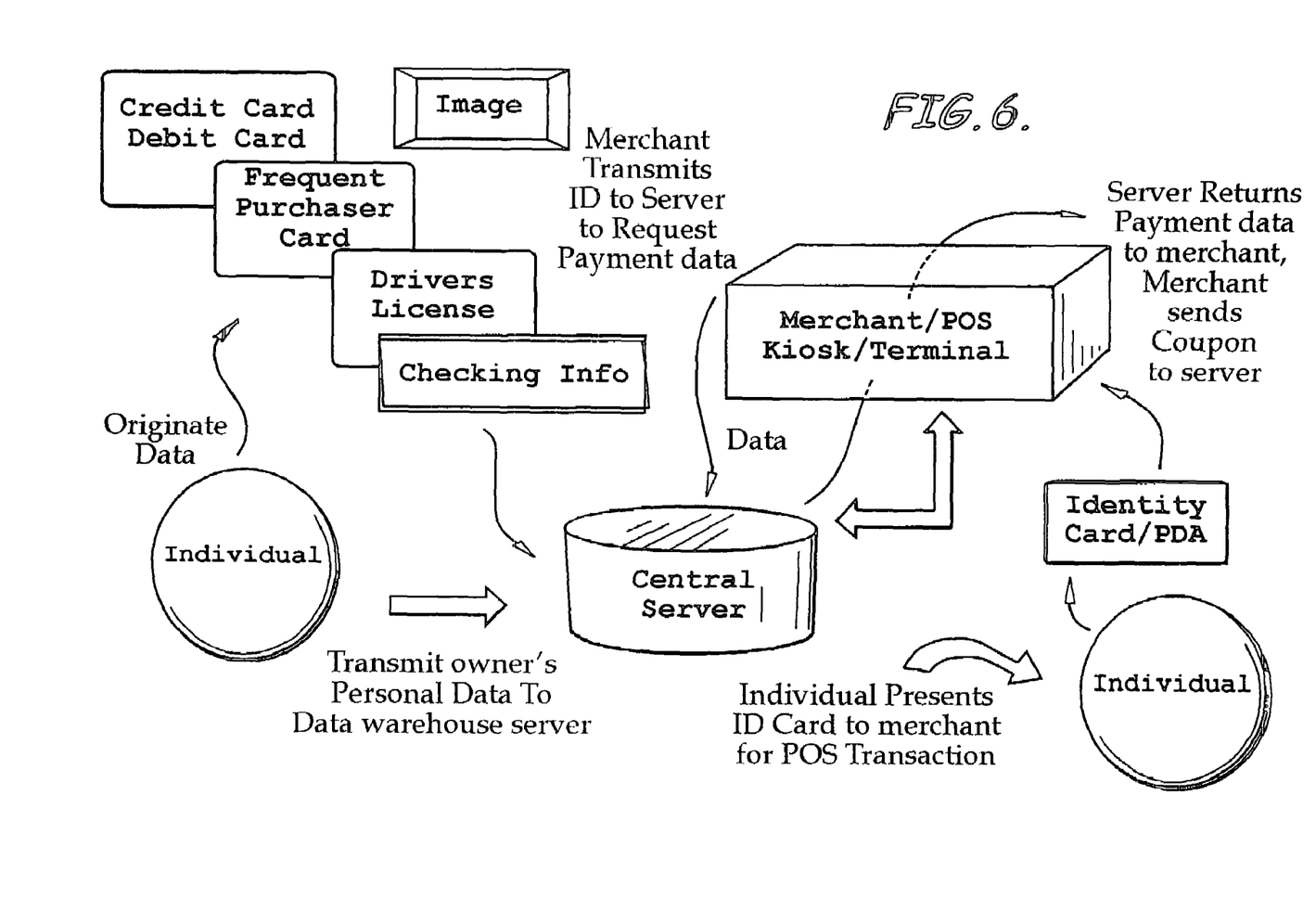
FIG. 6 is a transaction flow chart of a process for associating identification and personal data in accordance with the method and apparatus of the present invention.

Referring now to FIG. 6, there is shown a transaction flow chart of a process for associating identification and personal data utilizing the system described above with regard to FIGS. 1–5. As stated above, there are many instances whereby an individual, consumer, entity, organization, etc., would find it desirable to provide others with a secure, customized set of Id data that would facilitate a transaction and or event of a specific type. Additionally, the receiver of the data for the transaction may wish to provide complimenting and supplemental data back to the originator of the transaction and all such transactions being done in a digitized format to be interpreted, manipulated and/or displayed on Point-of sale transaction (POS) devices/computers both at the POS and remotely. Additionally, the process of initializing this secure transaction would be more flexible if the acceptors of the transaction could utilize a Magnetic stripe card that could combine a unique identifying code with the standard ISO data from other completely different financial or other card's magnetically striped data.

FIG. 6 visually illustrates an example of such a transaction as follows:

Individual A would transmit via computer/communication line, his or her personal data, to a remote computer server. In this case a downloaded or scanned personal image, a downloaded or read driver's license, checking account number, credit card, debit card and supermarket frequent purchaser card.

Through server prompted instructions, the individual would be asked to select a password to protect his data, then further prompts could permit him to associate, if he so desired, certain ID and or purchasing (credit/debit/checking account data) with particular transaction types, merchants, etc. In this example he could link the image, drivers license, checking account data and frequent purchaser card data with transactions driven by, for example, a supermarket with which he holds the frequent purchaser card. When shopping at the supermarket chain, he could present a magnetically striped card, smartcard, or radio frequency or infrared PDA transmitted personal ID number. The store POS would read the data, communicate ultimately with the central server, retrieve the customized transaction data, which could be displayed, including the image of the purchaser, on the store POS screen and the purchase would be confirmed with buyer and seller.

The supermarket could then transmit the purchase data back to the central server, including as an example an electronic coupon(s) for future purchases. The supermarket could be empowered by the individual to also transmit at any time to the server, other coupons, discounts offers and or communications which could be read and or redeemed by the customer for future purposes. The system could be expanded to include, by way of examples, membership ID's admittance, hospital, medical insurance, event ticketing, and/or money transfer type transactions. In this fashion, an individual and/or entity could minimize portability issues and facilitate complex identification needs such as biometrics, imaging, and fingerprint technologies.

It will readily be understood by one of ordinary skill in the art that multiple uses of this additional data can be had. Further, it will readily understood that there are numerous rearrangements, modifications or substitutions which are possible and this invention should not be limited without departing from the spirit of this invention as set forth above and defined by the following appended claims:

I claim:

1. A method comprising:
configuring at least one server configured to store a plurality of personal control ID's and a plurality of sets of personal data, each of the plurality of personal control ID's being associated with a respective different person and a respective set of personal data entered into the server and controlled by said respective different person;
configuring the at least one server also to store a data profile derived from a set of personal data associated with a personal control ID identifying a selected different person and assembled together by the selected different person for use by a selected one of one or more providers identified by a provider ID;
positioning a data processor remote from and in communication with the server;
positioning a retail point-of-sale (POS) terminal in communication with the data processor, the retail POS terminal adapted to couple via a data communication link to an ID instrument to receive from the ID instrument the personal control ID identifying the selected different person and to send the personal control ID identifying the selected different person to the data processor;
configuring the data processor to transmit the personal control ID identifying the selected different person and the provider ID identifying the selected provider to the at least one server;
configuring the at least one server to retrieve from the plurality of sets of personal data and transmit to the data processor the data profile derived from a set of personal data associated with the personal control ID identifying the selected different person for use by the selected provider identified by the provider ID; and
positioning an output device in connected with the data processor to receive from the data processor the data profile received from said the at least one server and to output the data profile to the selected provider to thereby verify the personal control ID as being associated with a user of the personal control ID at the retail POS prior to proceeding with a retail transaction.

2. A method as defined in claim 1, further comprising the at least one server to recognize that the personal control ID is being received prior to transmitting to the data processor the data profile derived from the set of personal data associated with the personal control ID identifying the selected different person.

3. A method as defined in claim 1, wherein the ID instrument comprises one or more of a magnetic striped card, a smart card, a bar code, a gift card, an automatic teller machine (ATM) card, a check card, a wallet consolidator, a debit card, a credit card, a smart card, a prepaid card, a personal identification card, a driver's license, a personal computer (PC), a laptop computer, a personal digital assistant (PDA) adapted for infra-red (IR) communication, a check, a keypad, a touchscreen, a voice recognition device, a radio-frequency (RF) device, the RF device comprising at least one of a PDA adapted for RF communication, an RF identification (RFID) tag, and a cell phone.

4. A method as defined in claim 1, wherein the personal data comprises one or more of a personal name, a personal ID, a pictorial image of the person, personal fingerprint data, personal checking account data, driver's license data of said person, personal biometric data, a personal social security number, a personal ID password, a personal data password, credit card data, debit card data, prepaid card data, frequent purchaser data, medical data, bank account data, investment data, coupon data, processed data, points, data generated based on existing personal data, and membership ID data of the person.

5. A method as defined in claim 1, wherein the processor, the POS terminal, and said output device are combined to constitute a substantially integrated input/output device.

6. A method as defined in claim 1, wherein the POS terminal comprises at least one of a magnetic card reader, a smart card reader, a bar code reader, an infra-red (IR) receiver, an optical scanner, a transmitter adapted for transmitting a pre-determined signal for activating a response from an RFID tag and for receiving a response back from said RFID tag, and an interface adapted for receiving RF signals from at least one of a cell phone and an RF device.

7. A method as defined in claim 1, wherein the output device comprises one or more of a visual display monitor and a printer.

8. A method as defined in claim 1, further comprising positioning the at least one server to receive from the data processor transaction ID information.

9. A method as defined in claim 1, further comprising positioning the at least one server to receive from the processor transaction ID information containing information relating to the transaction to be executed, including the type of information needed to execute the transaction and personal ID; and
 configuring the least one server to access a database to retrieve and process the personal data related to the personal ID and restricted according to the transaction ID information.

10. A method as defined in claim 1, wherein the data communication link comprises at least one of a wireless link, a wireline link, wide area network (WAN) link, an infra-red (IR) link, a radio-frequency (RF) link, an optical link, and a magnetic link.

11. A method as defined in claim 1, wherein the data profile is useable in a transaction for at least one of goods, services, grocery items, food, medical services and supplies, insurance premiums, ticketing, a money transfer, and identification services relating to the person.

12. A method as defined in claim 1, further comprising positioning the at least one server to receive the personal ID from the input device and for accessing a database to retrieve and process personal data related to the personal control ID for each of a plurality of persons, providers, and transactions.

13. A method as defined in claim 1, further comprising configuring the output device to generate, in response to receipt of personal data associated with the selected personal ID, information relating to the selected person for purposes of facilitating the transaction and the generation of customer messages.

14. A method as defined in claim 1, further comprising configuring the output device to generate, in response to receipt of personal data related to the selected personal ID, incentives to the selected person for making future purchases, the incentives including at least one of a coupon and a discount offer.

15. A method comprising:
 storing a plurality of personal control ID's and a plurality of sets of personal data, each of the plurality of personal control ID's being associated with a respective different person and a respective set of stored personal data controllable by the respective different personal;
 storing a data profile derived from the set of personal data associated with a personal control ID to identify a selected different person and assembled to be used by a selected one or more providers identified by a provider ID;
 receiving from an ID instrument the personal control ID identifying the selected different person;
 retrieving from the plurality of sets of personal data a data profile derived from a set of personal data associated with the personal control ID to be used by a selected one of the selected one or more providers identified by the provider ID; and
 providing the data profile to the selected provider to thereby verify the personal control ID as being associated with a use of the personal control ID prior to proceeding with a transaction.

16. A method as defined in claim 15, wherein the ID instrument comprises one or more of a magnetic striped card, a smart card, a bar code, a gift card, an automatic teller machine (ATM) card, a check card, a wallet consolidator, a debit card, a credit card, a smart card, a prepaid card, a personal identification card, a driver's license, a personal computer (PC), a laptop computer, a personal digital assistant (PDA) adapted for infra-red (IR) communication, a check, a keypad, a touchscreen, a voice recognition device, a radio-frequency (RF) device, said RF device comprising at least one of a PDA adapted for RF communication, an RF identification (RFID) tag, and a cell phone.

17. A method as defined in claim 15, wherein the personal data comprises one or more of a personal name, a personal ID, a pictorial image of the person, personal fingerprint data, personal checking account data, driver's license data of said person, personal biometric data, a personal social security number, a personal ID password, a personal data password, credit card data, debit card data, prepaid card data, frequent purchaser data, medical data, bank account data, investment data, coupon data, processed data, points, data generated based on existing personal data, and membership ID data of the person.

18. A method as defined in claim 15, wherein the data profile is useable in a transaction for at least one of goods, services, grocery items, food, medical services and supplies, insurance premiums, ticketing, a money transfer, and identification services relating to the person.

19. A method comprising:
 receiving from an ID instrument a personal control ID identifying a selected different person;
 receiving a data profile derived from a set of personal data associated with the personal control ID, the set of personal data including one or more providers identified by a provider ID; and
 using the data profile by the one or more providers identified by the provider ID to thereby verify the personal control ID as being associated with a user of the personal control ID prior to proceeding with a transaction.

20. A method as defined in claim 19, wherein the ID instrument comprises one or more of a magnetic striped card, a smart card, a bar code, a gift card, an automatic teller machine (ATM) card, a check card, a wallet consolidator, a debit card, a credit card, a smart card, a prepaid card, a personal identification card, a driver's license, a personal computer (PC), a laptop computer, a personal digital assistant (PDA) adapted for infra-red (IR) communication, a check, a keypad, a touchscreen, a voice recognition device, a radio-frequency (RF) device, said RF device comprising at least one of a PDA adapted for RF communication, an RF identification (RFID) tag, and a cell phone.

21. A method as defined in claim 19, wherein the personal data comprises one or more of a personal name, a personal ID, a pictorial image of the person, personal fingerprint data, personal checking account data, driver's license data of said person, personal biometric data, a personal social security number, a personal ID password, a personal data password, credit card data, debit card data, prepaid card data, frequent purchaser data, medical data, bank account data, investment data, coupon data, processed data, points, data generated based on existing personal data, and membership ID data of the person.

22. A method as defined in claim 19, wherein the data profile is useable in a transaction for at least one of goods, services, grocery items, food, medical services and supplies, insurance premiums, ticketing, a money transfer, and identification services relating to the person.

23. A program product stored in a tangible computer medium, the program product being operable on a computer to perform the steps of:
   receiving from an ID instrument a personal control ID identifying a selected different person;
   receiving a data profile derived from a set of personal data associated with the personal control ID, the set of personal data including one or more providers identified by a provider ID; and
   using the data profile by the one or more providers identified by the provider ID to thereby verify the personal control ID as being associated with a user of the personal control ID prior to proceeding with a transaction.

\* \* \* \* \*

UNITED STATES PATENT AND TRADEMARK OFFICE
CERTIFICATE OF CORRECTION

| | | |
|---|---|---|
| PATENT NO. | : 7,083,087 B1 | |
| APPLICATION NO. | : 11/130765 | |
| DATED | : August 1, 2006 | |
| INVENTOR(S) | : Frank J. Gangi | |

It is certified that error appears in the above-identified patent and that said Letters Patent is hereby corrected as shown below:

In the Abstract

Abstract, line 10, after the word "card" add --,--.

In the Specification

Column 1, line 24, after the word "limitation" add --,--; line 27, after the word "particularly" add --,--; line 43, delete the word "incorporates" and replace with --incorporate--; line 45, delete the word "allow" and replace with --allows--; line 57, after the word "supermarkets" add --,--; line 58, after the word "purchase" add --,--; line 63, after the word "outs" add --,--; line 66, delete the word "id" and replace with --ID--.

Column 2, line 3, delete the word "and" and replace with --with--; line 5, delete the words "Point-of sale" and replace with --point-of-sale--; line 24, delete the word "even" and replace with --event--; line 35, delete "(for which a Notice of Allowance has been" and replace with --, now U.S. Patent No. 6,131,811--; line 36, delete "issued)"; line 45, after the word "cards" add --,--; line 48, after the word "cards" add --,--, and after the word "memory" add --,--; line 51, delete the words "an other" and replace with --another--; line 53, after the word "data" delete "," and replace with --;--, and after the word "however" add --,--; line 59 delete "point of sale" and replace with --point-of-sale--; line 60, delete "ideal," and replace with --ideal.--, and delete the word "this" and replace with --This--; line 61, after the word "track" add --,--, and after the word "example" add --,--; line 62, after the word "character" add --,--; line 63, after the word "itself" add --,--; line 67, after the word "noted" add --,--.

Column 3, line 8, delete the word "that"; line 9, after the word "track" add --.--, and delete the word "specifically" and replace with --Specifically--; line 10, after the word "be" add --,--, and after the word "example" add --,--; line 11, delete the word "and" and replace with --can--; line 13, delete the word "designed" and replace with --design--; line 16, after the word "number" add --,--, and after the word "like" add --,--; line 18, after the word "used" add --may be written--, and after the word "sentinel" delete the words --is present--; line 19, after the word "codes" add --,--; line 20, after the word "readers" add --,--; line 21, after the word "therefore" add --,--; line 36, delete the words "and which" and replace with --wherein--; line 62, after the word "consolidator" add --,--; line 63, after the word "above" add --,--.

UNITED STATES PATENT AND TRADEMARK OFFICE
CERTIFICATE OF CORRECTION

PATENT NO. : 7,083,087 B1
APPLICATION NO. : 11/130765
DATED : August 1, 2006
INVENTOR(S) : Frank J. Gangi It is certified that error appears in the above-identified patent and that said Letters Patent is hereby corrected as shown below:

Column 4, line 1, after the word "track" add --,--; line 5, after the word "fact" add --,--; line 10, after the word "in" add the word --the--; line 15, after the words "memory chip" add --,--, and after the words "smart chip" add --,--; line 16, after the word "information" add --;--; line 17, after the word "device" add --,--; line 18, after the word "consolidator" add --,--; line 20, after the word "format" delete --,--; line 21, after the word "data" add --,--; line 23, after the word "indicate" add the word --that--, and delete the word "type"; line 24, delete the word "of", and after the word "format" add the word --and--, and delete the words "at using these control codes"; line 25, after the word "data" add --,--; line 26, after the word "track" add --,--; line 30, after the word "codes" add --,--; line 32, after the word "codes" add --,--; line 35, after the word "Further" add --,--; line 38, after the word "terminal" add --,--; line 39, after the word "reprogramming" add --,--; line 44, after the word "Further" add --,--; line 46, after the word "is" add --,--, and after the word "example" add --,--; line 47, delete the "card" and replace with --card. A--; line 58, delete the word "provides" and replace with --provide--; line 59, after the word "card" add --,--; line 61, after the word "effectively" delete the word "to"; line 62, after the word "track" add --,--; line 63, delete the word "as" and replace with --and--.

Column 5, line 7, delete the word "Id" and replace with --ID--; line 8, delete the words "and or" and replace with --and/or--; line 13, delete "Point-of sale" and replace with --point-of-sale--; line 23, after the word "server" add --;--; line 24, delete the word "In" and replace with --in--, and after the word "case" add --,--; line 31, delete the word "ID" and replace with --IDs--, and delete the words "and or" and replace with --and/or--; line 31, after the word "purchasing" add the word --data--; line 33, after the word "example" add --,--; line 41, before the word "retrieve" add the word --and--; line 43, after the word "screen" add --,--; line 46, after the word "example" add --,--; line 49, delete the words "and or" and replace with --and/or--; line 50, delete the words "and or" and replace with --and/or--; line 62, delete the words "and this invention should not be limited".

UNITED STATES PATENT AND TRADEMARK OFFICE
CERTIFICATE OF CORRECTION

PATENT NO.       : 7,083,087 B1
APPLICATION NO.  : 11/130765
DATED            : August 1, 2006
INVENTOR(S)      : Frank J. Gangi It is certified that error appears in the above-identified patent and that said Letters Patent is hereby corrected as shown below:

In the Claims

Column 6, line 3 (claim 1, line 2), delete the word "configured"; line 8 (claim 1, line 7), before the word "server" add the words --at least one--, and delete the word "said" and replace with --the--; line 11 (claim 1, line 10), delete the word "a" and replace with --the--; line 12 (claim 1, line 11), delete the words "with a" and replace with --with the--, and delete the words "identifying a" and replace with --identifying the--; line 36 (claim 1, line 35), delete the word "connected" and replace with --connection--; line 38 (claim 1, line 37), delete the word "said"; line 43 (claim 2, line 1), after the word "comprising" add the word --configuring--; line 57 (claim 3, line 9), after "device," add the word --and--; line 63 (claim 4, line 3), after the word "the" add the words --selected different--; line 64 (claim 4, line 4), delete the word "said" and replace with --the selected different--.

Column 7, line 4 (claim 4, line 11), after the word "the" add the words --selected different--; line 6 (claim 5, line 2), delete the word "said" and replace with --the--; line 14 (claim 6, line 7), delete the word "said" and replace with --the--; line 26 (claim 9, line 5), after the word "and" add the word --the--; line 27 (claim 9, line 6), before the word "ID" add the word --control--; line 30 (claim 9, line 9), after the word "personal" add the word --control--; line 41 (claim 11, line 5), after the word "the" add the words --selected different--; line 43 (claim 12, line 2), after the word "personal" add the word --control--; line 50 (claim 13, line 3), delete the word "selected"; line 51 (claim 13, line 4), before the word "ID" add the word --control--, and after the word "selected" add the word --different--; line 56 (claim 14, line 3), before the word "ID" add the word --control--; line 57 (claim 14, line 4), after the word "selected" add the word --different--; line 65 (claim 15, line 6), delete "personal;" and replace with --person--.

Column 8, line 13 (claim 15, line 21), delete the word "use" and replace with --user--; line 23 (claim 16, line 9), after "device," add the word --and--; line 24 (claim 16, line 10), delete the word "said" and replace with --the--; line 30 (claim 17, line 4), delete the word "said" and replace with --the selected different--; line 37 (claim 17, line 11), after the word "the" add the words --selected different--; line 42 (claim 18, line 5), after the word "the" add the words --selected different--; line 63 (claim 20, line 9), after "device," add the word --and--; line 64 (claim 20, line 10), delete the word "said" and replace with --the--.

UNITED STATES PATENT AND TRADEMARK OFFICE
CERTIFICATE OF CORRECTION

PATENT NO. : 7,083,087 B1
APPLICATION NO. : 11/130765
DATED : August 1, 2006
INVENTOR(S) : Frank J. Gangi It is certified that error appears in the above-identified patent and that said Letters Patent is hereby corrected as shown below:

Column 9, line 3 (claim 21, line 3), after the word "the" add the words --selected different--; line 4 (claim 21, line 4), delete the word "said" and replace with --the selected different--; line 11 (claim 21, line 11), after the word "the" add the words --selected different--; line 16 (claim 22, line 5), after the word "the" add the words --selected different--.

Signed and Sealed this

Eighth Day of September, 2009

David J. Kappos
*Director of the United States Patent and Trademark Office*